(12) United States Patent
Cho et al.

(10) Patent No.: US 6,916,580 B2
(45) Date of Patent: Jul. 12, 2005

(54) POSITIVE ACTIVE MATERIAL FOR A RECHARGEABLE LITHIUM BATTERY, METHOD FOR PREPARING THE SAME AND BATTERY CONTAINING THE SAME

(75) Inventors: Jae-Phil Cho, Cheonan (KR); Byung-Woo Park, Seoul (KR); Yong-Jeong Kim, Seoul (KR); Tae-Jun Kim, Seoul (KR)

(73) Assignee: Samsung SDE Co., Ltd., Suwon (KR)

( * ) Notice: Subject to any disclaimer, the term of this patent is extended or adjusted under 35 U.S.C. 154(b) by 229 days.

(21) Appl. No.: 10/270,811

(22) Filed: Oct. 15, 2002

(65) Prior Publication Data

US 2003/0087155 A1 May 8, 2003

(30) Foreign Application Priority Data

Oct. 24, 2001 (KR) .................................... 2001-65805

(51) Int. Cl.$^7$ ................................................. H01M 4/58
(52) U.S. Cl. ........................ 429/231.1; 429/231.95; 429/231.3; 429/223; 429/224; 429/232; 252/520.4; 252/521.2
(58) Field of Search .......................... 429/231.95, 223, 429/224, 231.1, 231.3, 232; 252/520.4, 521.2

(56) References Cited

U.S. PATENT DOCUMENTS

| | | | |
|---|---|---|---|
| 5,292,601 A | 3/1994 | Sugeno et al. | |
| 5,705,291 A | 1/1998 | Amatucci et al. | |
| 6,534,217 B2 * | 3/2003 | Koga et al. | 429/231.95 |
| 2002/0071990 A1 * | 6/2002 | Kweon et al. | 429/231.1 |
| 2003/0082448 A1 * | 5/2003 | Cho et al. | 429/218.1 |

FOREIGN PATENT DOCUMENTS

DE 199 22 522 A1 11/2000

OTHER PUBLICATIONS

Fredel, et al., "Processing and mechanical properties of biocompatible $Al_2O_3$ platelet–reinforced $TiO_2$," Journal of Material Science (1996) pp 4375–4380.

Sehgal, et al., "Brittleness of glass," Journal of Non–Crystalline Solids 253 (1999) pp 126–132.

Callister Jr., "13.8 Stress–Strain Behavior," Material Science and Engineering, Fourth Edition, 1997, pp. 399–401 and 787–788.

English Patent Abstract of DE 19922522, Published Nov. 16, 2002, in the name of Merck Patent GmbH.

* cited by examiner

Primary Examiner—Laura Weiner
(74) Attorney, Agent, or Firm—Christie, Parker and Hale, LLP (57) ABSTRACT

A positive active material for a rechargeable lithium battery is provided. The positive active material comprises a lithiated intercalation compound and a coating layer formed on the lithiated intercalation compound. The coating layer comprises a solid-solution compound and an oxide compound having at least two coating elements, the oxide compound represented by the following Formula 1:

$$M_pM'_qO_r \qquad (1)$$

wherein M and M' are not the same and are each independently at least one element selected from the group consisting of Zr, Al, Na, K, Mg, Ca, Sr, Ni, Co, Ti, Sn, Mn, Cr, Fe, and V; $0<p<1$; $0<q<1$; and $1<\underline{r}\leq 2$, where r is determined based upon p and q. The solid-solution compound is prepared by reacting the lithiated intercalation compound with the oxide compound. The coating layer has a fracture toughness of at least 3.5 MPam$^{1/2}$. A method of making the positive active material is also provided.

28 Claims, 5 Drawing Sheets

POSITIVE ACTIVE MATERIAL FOR A RECHARGEABLE LITHIUM BATTERY, METHOD FOR PREPARING THE SAME AND BATTERY CONTAINING THE SAME

CROSS REFERENCE TO RELATED APPLICATION

This application claims priority of Korea Patent Application No. 2001-65805 filed on Oct. 24, 2001 in the Korean Intellectual Property Office, the disclosure of which is incorporated herein by reference.

BACKGROUND OF THE INVENTION (a) Field of the Invention

The present invention relates to a positive active material for a rechargeable lithium battery and a method for preparing the same, and more particularly, to a positive active material for a rechargeable lithium battery having structural stability and improved cycle-life characteristics and a method for preparing the same.

(b) Description of the Related Art

A rechargeable lithium battery having an average discharge potential of approximately 3.7 V, i.e. a battery having substantially 4V, is considered to be one of the essential components in the digital generation since it is an indispensable energy source for portable digital devices such as cellular phones, notebook computers, and camcorders, which are often called "3C" devices.

A rechargeable lithium battery uses materials from or into which lithium ions are deintercalated or intercalated for positive and negative active materials. For the electrolyte, a lithium salt solution in an organic solvent or a polymer is used. A rechargeable lithium battery produces electric energy as a result of changes in the chemical potentials of the active materials during the intercalation and deintercalation reactions of the lithium ions.

For the negative active material in the rechargeable lithium battery, metallic lithium was used in the early days of development. Recently, however, because the metallic lithium causes a short battery life due to its high reactivity with the electrolyte and the formation of lithium dendrites, carbonaceous materials such as amorphous carbon or crystalline carbon, which reversibly intercalate lithium ions, have extensively been used instead of the metallic lithium. It has also been suggested to add additives such as boron to the carbonaceous material in order to improve the capability of carbonaceous material. For example, a boron-coated graphite (BOC) improves the performance characteristics of the carbonaceous materials.

For the positive active material in the rechargeable lithium battery, chalcogenide compounds into or from which lithium ions are intercalated or deintercalated are used. Typical examples thereof include $LiCoO_2$, $LiMn_2O_4$, $LiNiO_2$, $LiNi_{1-x}Co_xO_2$ (0<x<1), and $LiMnO_2$. A manganese-based positive active material such as $LiMn_2O_4$ or $LiMnO_2$ is attractive since it is readily prepared, is less expensive than the other materials, and is environmentally friendly. However, the manganese-based materials have the disadvantage a relatively low capacity. $LiNiO_2$ is inexpensive and has a high capability, but it is difficult to prepare in the desired structure, and it becomes structurally unstable during the charge and discharge. Among these materials, $LiCoO_2$ is most accepted in the battery market since its overall performance characteristics are better than the others. Accordingly, most of the current commercially available rechargeable lithium batteries (approximately 95%) adopt $LiCoO_2$ as the positive active material, but it is rather expensive. There is a great deal of effort being expended to find an alternative, in order to reduce the cost of the active material.

The positive active material for the rechargeable lithium battery is also called a Li-intercalation compound because its structural stability and capacity are determined by the nature of reversible intercalation/deintercalation reactions of lithium ion. The structure of the Li-intercalation compound is converted during the intercalation/deintercalation reaction of lithium ion, and its structural stability is strongly influenced by the composition of the positive active material, $Li_xMO_2$ (M=Ni or Co), i.e. the value of x. For example, when x is at least 0.5, the phase transition occurs from a hexagonal phase to a monoclinic phase, while when x is less than 0.5, the hexagonal phase reappears. Anisotropic volumetric expansion caused by the phase transition will generate micro-cracks on the positive active material, causing damage to its morphological structure, and charge-discharge efficiencies of lithium as well as cycle-life characteristics consequently deteriorate. Accordingly, there are still demands to find a positive active material for a rechargeable lithium battery in which anisotropic volumetric expansion is minimized.

In order to improve the structural stability of the active material during charge and discharge, it is suggested that the Ni-based lithiated oxide or the Co-based lithiated oxide be doped with other elements. In U.S. Pat. No. 5,292,601, $Li_xMO_2$ (wherein M is an element selected from Co, Ni, or Mn; x is 0.5–1) is suggested to improve the performance for $LiCoO_2$. However, there are continuing demands for further improved positive active materials, especially for structural stability and cycle-life characteristics.

SUMMARY OF THE INVENTION

In one embodiment, the present invention is directed to a positive active material for a rechargeable lithium battery comprising a lithiated intercalation compound, and a coating layer formed on the lithiated intercalation compound. The coating layer includes a solid-solution compound and an oxide compound having at least two coating elements. The oxide compound having at least two coating elements is represented as the following Formula 1:

$$M_pM'_qO_r \qquad (1)$$

wherein M and M' are not the same and are each independently at least one element selected from the group consisting of Zr, Al, Na, K, Mg, Ca, Sr, Ni, Co, Ti, Sn, Mn, Cr, Fe, and V, 0<p<1,
0<q<1, and
1<r≦2, r is determined based upon p and q. The solid-solution compound is prepared by reacting the lithiated intercalation compound and the oxide compound. The coating layer has a fracture toughness of at least 3.5 $MPam^{1/2}$.

In another embodiment, the invention is directed to a positive active material for a rechargeable lithium battery comprising a lithiated intercalation compound and a coating layer formed on the lithiated intercalation compound. The coating layer comprises an oxide compound having at least two coating elements represented by the following Formula 1:

$$M_pM'_qO_r \qquad (1)$$

wherein M and M' are not the same and are each independently at least one element selected from the group consisting of Zr, Al, Na, K, Mg, Ca, Sr, Ni, Co, Ti, Sn, Mn, Cr, Fe, and V;

$0<p<1$;

$0<q<1$; and $1<\underline{r}\leq 2$, where r is determined based upon p and q.

The present invention also provides a method of preparing a positive active material for a rechargeable lithium battery. In this method, a coating liquid comprising at least two coating elements is prepared. To the coating liquid, a lithiated intercalation compound is added and coated. Then, the coated lithiated intercalation compound is subjected to heat-treatment to provide a positive active material in which the lithiated intercalation compound with a coating layer has a fracture toughness of at least 3.5 MPam$^{1/2}$. The coating layer includes a solid-solution compound and an oxide compound having at least two coating elements. The solid-solution compound is prepared by reacting the lithiated intercalation compound and the oxide compound. The oxide compound having at least two coating elements is represented as the following Formula 1:

$$M_p M'_q O_r \qquad (1)$$

wherein M and M' are not the same and are each independently at least one element selected from the group consisting of Zr, Al, Na, K, Mg, Ca, Sr, Ni, Co, Ti, Sn, Mn, Cr, Fe, and V; $0<p<1$; $0<q<1$; and $1<\underline{r}\leq 2$, where r is determined based upon p and q.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Hereinafter, the present invention is described in detail.

The present invention relates to a positive active material for a rechargeable lithium battery having a lithiated intercalation compound with a surface on which a coating layer is formed. The coating layer has a fracture toughness of at least 3.5 MPam$^{1/2}$ and includes an oxide compound having at least two coating elements and a solid-solution compound. The solid-solution compound is formed by reacting the lithiated intercalation compound with the oxide compound.

The lithiated intercalation compound is anisotropically expanded and contracted during the intercalation/deintercalation reaction of lithium ions, and it thereby undergoes phase transition at the a-axis and c-axis of the positive active material. If the ratios of the volumetric expansion and contraction of the lithiated intercalation compound are over 0.2%, too many micro-cracks are generated to ensure stability of the structure.

The present invention provides a coating layer on the surface of the lithiated intercalation compound in order to improve the structural stability of the compound. The coating layer should be able to tolerate the anisotropic volumetric variation, and it includes a solid-solution compound and an oxide compound having at least two coating elements. The solid-solution compound is prepared by reacting the lithiated intercalation compound and the oxide compound. The oxide compound having at least two coating elements is represented by the following Formula 1:

$$M_p M'_q O_r \qquad (1)$$

wherein M and M' are not the same and are each independently at least one element selected from the group consisting of Zr, Al, Na, K, Mg, Ca, Sr, Ni, Co, Ti, Sn, Mn, Cr, Fe, and V; $0<p<1$; $0<q<1$; and $1<\underline{r}\leq 2$, where r is determined based upon the values of p and q.

According to a preferred example of the present invention, the oxide compound having at least two coating elements is a zirconium-containing oxide compound represented by the following Formula 2:

$$Zr_p M'_q O_r \qquad (2)$$

wherein M' is at least one element selected from the group consisting of Al, Na, K, Mg, Ca, Sr, Ni, Co, Ti, Sn, Mn, Cr, Fe, and V, preferably Al; $0<p<1$; $0<q<1$; and $1<\underline{r}\leq 2$, where r is determined based upon the values of p and q.

In this embodiment, the positive active material of the present invention comprises a lithiated intercalation compound, and a coating layer is formed on the lithiated intercalation compound. The coating layer has a fracture toughness of at least 3.5 MPam$^{1/2}$ and includes a solid-solution compound and an oxide compound having a zirconium-containing oxide compound as shown in the above Formula 2. The solid-solution compound is prepared by reacting the lithiated intercalation compound with the zirconium-containing oxide compound.

The coating layer has a fracture toughness of at least 3.5 MPam$^{1/2}$ and preferably at least 10 MPam$^{1/2}$. When the fracture toughness is less than 3.5 MPam$^{1/2}$, the structural stability is not sufficiently improved.

The content of the coating element present in the coating layer preferably ranges from 0.1 to 10 wt %, more preferably from 1 to 7 wt %. If the coating element is present in an amount less than 0.1 wt % in the coating layer, the coating effect is not sufficient, while if the coating element is present in an amount more than 10 wt % in the coating layer, it is also not desirable, since charge-discharge capacity and efficiency deteriorate.

The fracture toughness is a maximum point tolerable to mechanical fracture, so that it is understood that the higher the fracture toughness is, the more stable the material structure is. The fracture toughness is generally measured by a single-edge-notched beam (SENB) method or an indentation crack length (ICL) method. Table 1 shows the results of fracture toughness measurements made by the indentation crack length (ICL) method.

TABLE 1

| Oxide Compound | Fracture Toughness (MPam$^{1/2}$) |
| --- | --- |
| ZrAlO$_4$ | 10~14 |
| ZrO$_2$ | 8~10 |
| Al$_2$O$_3$ | 2.7~4.2 |
| TiO$_2$ | 2.38 |
| B$_2$O$_3$ | 1.44 |
| SiO$_2$ | 0.70 |

As shown in Table 1, the ternary-element oxide compound ZrAlO$_4$ (which is stoichiometrically equivalent to Zr$_{0.5}$Al$_{0.5}$O$_2$) has a fracture toughness superior to that of the binary-element oxide compound. Notably, it was discovered that the structural stability of the positive active material improves and the cycle-life characteristics dramatically improve when the lithiated intercalation compound is coated with a coating layer of a ternary-element oxide compound or an oxide compound of more than 3 elements having a high fracture toughness. It is postulated that the coating layer reduces the anisotropic volumetric variation caused by intercalation/deintercalation of lithium ions during charge and discharge.

The coating layer includes, in addition to the oxide compound having at least two coating elements, a solid-solution compound prepared by reacting the oxide compound with the lithiated intercalation compound. The solid-solution compound can be formed to the depth of no more than 20,000 Å from the surface of the coating layer. The solid-solution compound is distributed with a concentration gradient such that the concentration decreases toward the center of the positive active material.

Generally, the fracture toughness increases with an increase in the thickness of the coating layer, but the thickness preferably ranges from 0.01 to 2 μm and more preferably from 0.01 to 0.1 μm. If the thickness of the coating layer is less than 0.01 μm, the cycle-life characteristics do not sufficiently improve, while if the thickness is over 2 μm, the capacity is reduced.

The lithiated intercalation compound is capable of intercalating lithium ions and includes a lithiated metal oxide or a lithiated calcogenide compound. These compounds have a fundamentally cubic, hexagonal, or monoclinic structure. Preferably the lithiated intercalation compound is selected from the following compounds, represented by Formulas (3) to (15):

$$Li_xMn_{1-y}M'_yA_2 \qquad (3)$$

$$Li_xMn_{1-y}M'_yO_{2-z}X_z \qquad (4)$$

$$Li_xMn_2O_{4-z}X_z \qquad (5)$$

$$Li_xMn_{2-y}M'_yA_4 \qquad (6)$$

$$Li_xCo_{1-y}M'_yA_2 \qquad (7)$$

$$Li_xCo_{1-y}M'_yO_{2-z}X_z \qquad (8)$$

$$Li_xNi_{1-y}M'_yA_2 \qquad (9)$$

$$Li_xNi_{1-y}M'_yO_{2-z}X_z \qquad (10)$$

$$Li_xNi_{1-y}Co_yO_{2-z}X_z \qquad (11)$$

$$Li_xNi_{1-y-z}Co_yM'_zA_\alpha \qquad (12)$$

$$Li_xNi_{1-y-z}Co_yM'_zO_{2-\alpha}X_\alpha \qquad (13)$$

$$Li_xNi_{1-y-z}Mn_yM'_zA\alpha \qquad (14)$$

$$Li_xNi_{1-y-z}Mn_yM'_zO_{2-\alpha}X_\alpha \qquad (15)$$

wherein
0.95≦x≦1.1; 0≦y≦0.5; 0≦z≦0.5; 0≦α≦2;

M' is an element selected from the group consisting of Al, Ni, Co, Mn, Cr, Fe, Mg, Sr, V, Sc, Y, and elements of the lanthanoid group;

A is an element selected from the group consisting of O, F, S, and P; and

X is an element selected from the group consisting of F, S, and P.

The particle size of the lithiated intercalation compound preferably ranges from 1 to 20 μm, and more preferably from 3 to 15 μm.

To coat the positive active material of the present invention, the coating liquid having at least two coating elements is used. The coating liquid is prepared by adding a coating-element source such as a coating-element-containing alkoxide, a coating-element-containing salt, or a coating-element-containing oxide to an organic solvent. Examples of the organic solvent include, but are not limited to, alcohols such as methanol, ethanol, and isopropanol; hexane; chloroform; tetrahydrofuran; ether; methylene chloride; and acetone. The coating liquid is prepared by adding a coating-element source to one or more solvents to form a solution or a suspension.

The concentration of the coating-element is preferably 10 to 70 wt % of the coating liquid. When the concentration of the coating element is below 10 wt %, coating is not fully effective, whereas when the concentration is more than 70 wt %, charge-discharge capacity and efficiency undesireably deteriorate.

Subsequently, the lithiated intercalation compound is introduced into the coating liquid. The coating method preferably comprises a dip coating method since it is a simple method, but it may include other coating methods such as a spray coating method.

The coated lithiated intercalation compound is subjected to heat-treatment to provide a coated positive active material. The heat treatment process is preferably performed at a temperature ranging from 300 to 800° C. for 3 to 10 hours. An additional drying step may be carry out before the heat treatment, preferably at a temperature ranging from 80 to 200° C. for 1 to 5 hours. The lithiated intercalation compound reacts with the oxide compound during the heat-treatment to provide a solid-solution compound. If the heat-treating temperature is below 300° C., the capacity and cycle-life characteristics do not improve, while if it is over 800° C., the coating layer is burned out.

Figure 5:
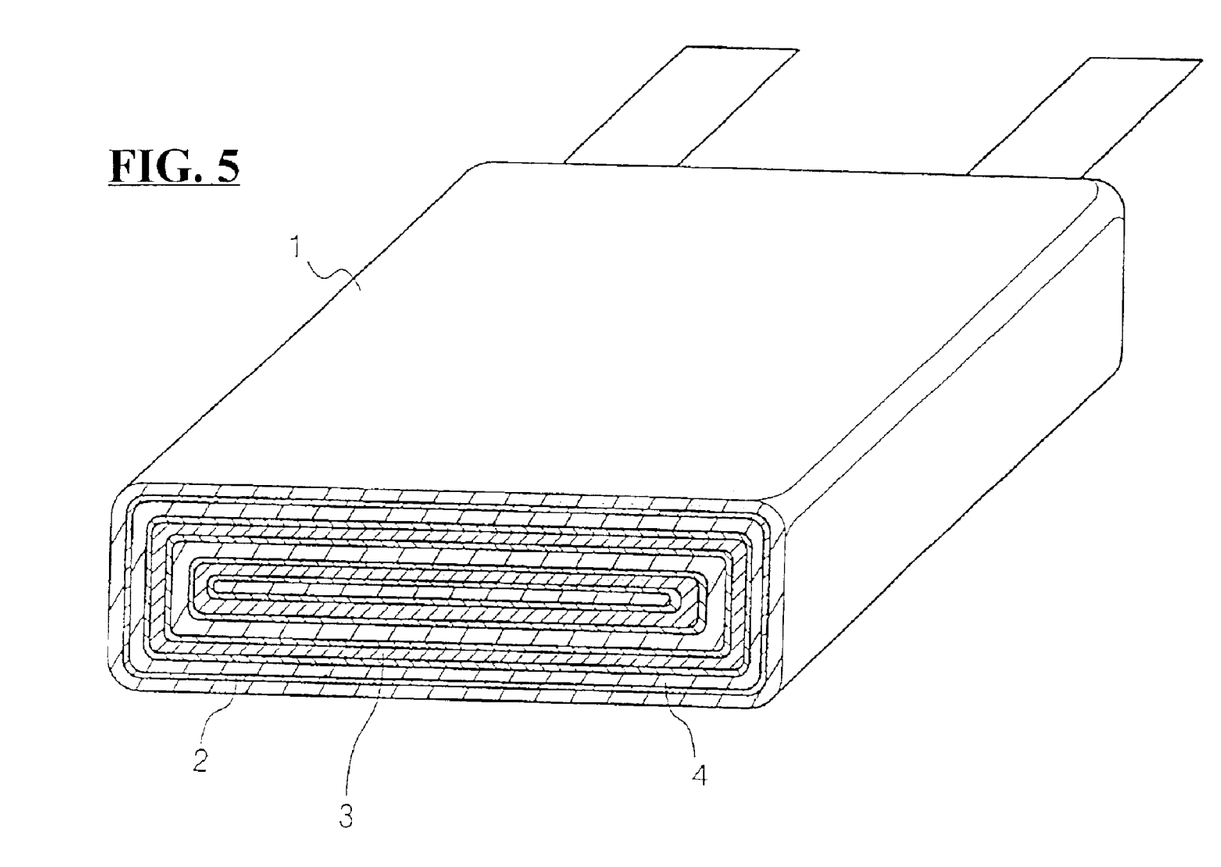
FIG. 5 is a perspective view of a battery according to the invention.

The resultant positive active material is added to and mixed with an organic solvent together with a binder and a conductive agent to provide a positive active material slurry. The slurry is coated on a collector to provide a positive electrode 3 for a rechargeable lithium battery. The prepared positive electrode 3, along with a negative active material to form a negative electrode 4, a separator 2 and an electrolyte are put into a case 1 to fabricate a rechargeable lithium cell. The negative electrode comprises a negative active material capable of reversibly intercalating lithium ions. The electrolyte comprises a lithiated compound and an organic solvent. The negative active material and the electrolyte include any conventional materials capable of being used in the rechargeable lithium battery art.

The following examples illustrate the present invention in further detail, but the present invention is not limited by these examples.

EXAMPLE 1

50 wt % of a zirconium ethylhexanoisopropoxide suspension and 50 wt % of an aluminum ethylhexanoisopropoxide suspension in a volume ratio of 1:1 were mixed to obtain a coating liquid. The obtained coating liquid and $LiCoO_2$ powder having an average particle size of 10 μm were mixed in a weight ratio of 50:50 in 50 g of isopropanol to coat the $LiCoO_2$ powder with the coating liquid. The coated $LiCoO_2$ powder was dried at 100° C. for 2 hours, then heat-treated at 400° C. for 10 hours to form solid-solution compounds of $ZrAlO_4$ and $LiCo_{1-a}Zr_bAl_cO_2$ ($0<a\leq0.6$, $0<b\leq0.2$, $0<c\leq0.2$) on the surface thereof. Using the obtained positive active material precursor, a Super P conductive agent, and a polyvinylidene fluoride in a weight ratio of 92:4:4, a positive active material slurry was provided. The positive active material slurry film was cast on an Al-foil to about 100 μm, and then compressed to provide a positive electrode for a coin cell. The positive electrode was punched in a circle shape with a diameter of 1.6 cm. Using the prepared positive electrode and a lithium counter-electrode, a coin cell was fabricated in a glove box. For the electrolyte, a 1 M $LiPF_6$ solution of ethylene carbonate and dimethyl carbonate (1:1 volume ratio) was used.

EXAMPLE 2

A coin cell was fabricated by the same procedure as in Example 1, except that 50 wt % of a zirconium ethylhexanoisopropoxide suspension was mixed with 50 wt % of a nickel ethylhexanoisopropoxide suspension in a volume ratio of 1:1 to provide the coating liquid.

EXAMPLE 3

A coin cell was fabricated by the same procedure as in Example 1, except that 50 wt % of a zirconium ethylhexanoisopropoxide suspension was mixed with 50 wt % of an aluminum ethylhexanoisopropoxide suspension and 50 wt % of a nickel ethylhexanoisopropoxide suspension in a volume ratio of 1:1:1 to provide the coating liquid.

EXAMPLE 4

A coin cell was fabricated by the same procedure as in Example 1, except that $LiNiO_2$ having an average particle size of 10 μm was used instead of $LiCoO_2$.

EXAMPLE 5

A coin cell was fabricated by the same procedure as in Example 1, except that $LiMn_2O_4$ having an average particle size of 13 μm was used instead of $LiCoO_2$.

EXAMPLE 6

A coin-type half-cell was fabricated by the same procedure as in Example 1, except that $LiNi_{0.9}Co_{0.1}Sr_{0.002}O_2$ having an average particle size of 13 μm was used instead of $LiCoO_2$.

EXAMPLE 7

A coin cell was fabricated by the same procedure as in Example 1, except that $LiNi_{0.8}Mn_{0.2}O_2$ having an average particle size of 10 μm was used instead of $LiCoO_2$.

EXAMPLE 8

A coin cell was fabricated by the same procedure as in Example 1, except that $Li_{1.03}Ni_{0.69}Mn_{0.19}Co_{0.1}Al_{0.07}Mg_{0.07}O_2$ having an average particle size of 13 μm was used instead of $LiCoO_2$.

COMPARATIVE EXAMPLE 1

A coin cell was fabricated by the same procedure as in Example 1, except that an uncoated $LiCoO_2$ powder having an average particle size of 10 μm was used.

COMPARATIVE EXAMPLE 2

A coin cell was fabricated by the same procedure as in Example 1, except that 4 wt % of an aluminum ethylhexanoisopropoxide suspension was used as the coating liquid source.

COMPARATIVE EXAMPLE 3

A coin cell was fabricated by the same procedure as in Example 1, except that 4 wt % of a titanium ethylhexanoisopropoxide suspension was used as the coating liquid source.

COMPARATIVE EXAMPLE 4

A coin cell was fabricated by the same procedure as in Example 1, except that 4 wt % of a boron ethylhexanoisopropoxide suspension was used as the coating liquid source.

COMPARATIVE EXAMPLE 5

A coin cell was fabricated by the same procedure as in Example 1, except that 4 wt % of a silicon ethylhexanoisopropoxide suspension was used as the coating liquid source.

COMPARATIVE EXAMPLE 6

A coin cell was fabricated by the same procedure as in Example 1, except that 4 wt % of a zirconium ethylhexanoisopropoxide suspension was used as the coating liquid source.

COMPARATIVE EXAMPLE 7

A coin cell was fabricated by the same procedure as in Example 1, except that an uncoated $LiNiO_2$ powder having an average particle size of 10 μm was used.

Figure 1:
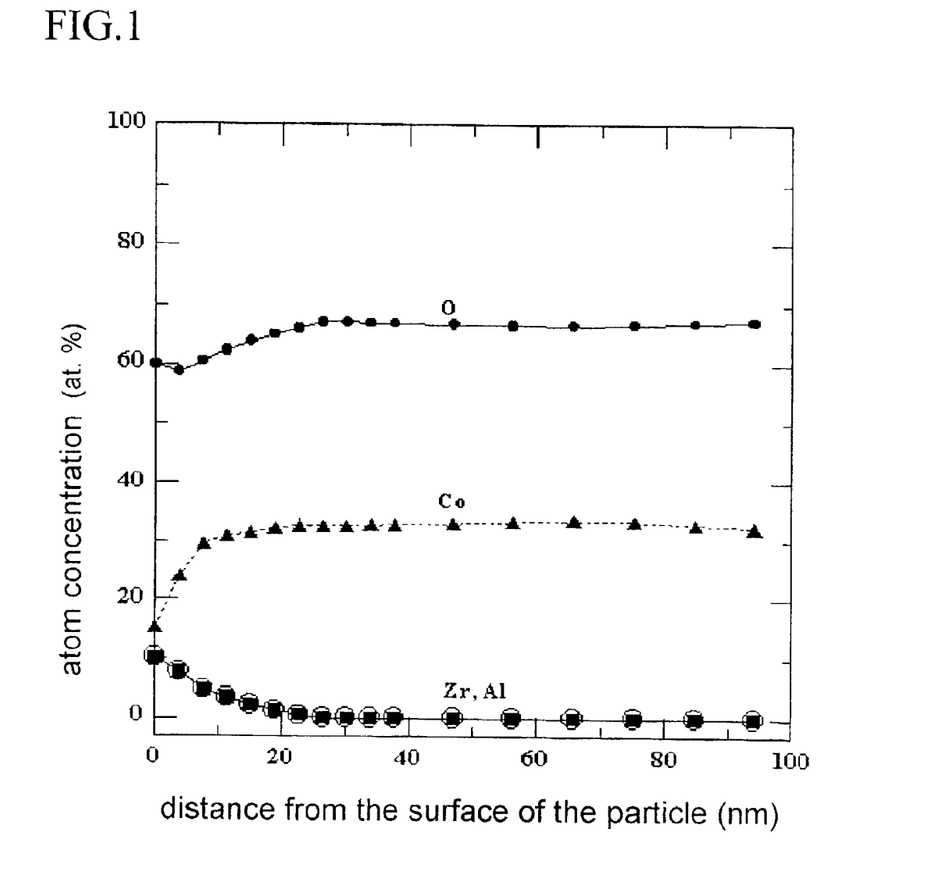
FIG. 1 is a view showing a concentration distribution of coating elements from the surface to the center of the positive active material fabricated by the method according to Example 1 of the present invention.

FIG. 1 shows the Auger Electron Spectroscopy Analysis results of the positive active material fabricated by the method according to Example 1. It is recognized that the concentrations of zirconium and aluminum decrease toward the center of the positive active material. Accordingly, zirconium and aluminum present in the coating layer are present mostly around the surface of the positive active material.

Figure 2:
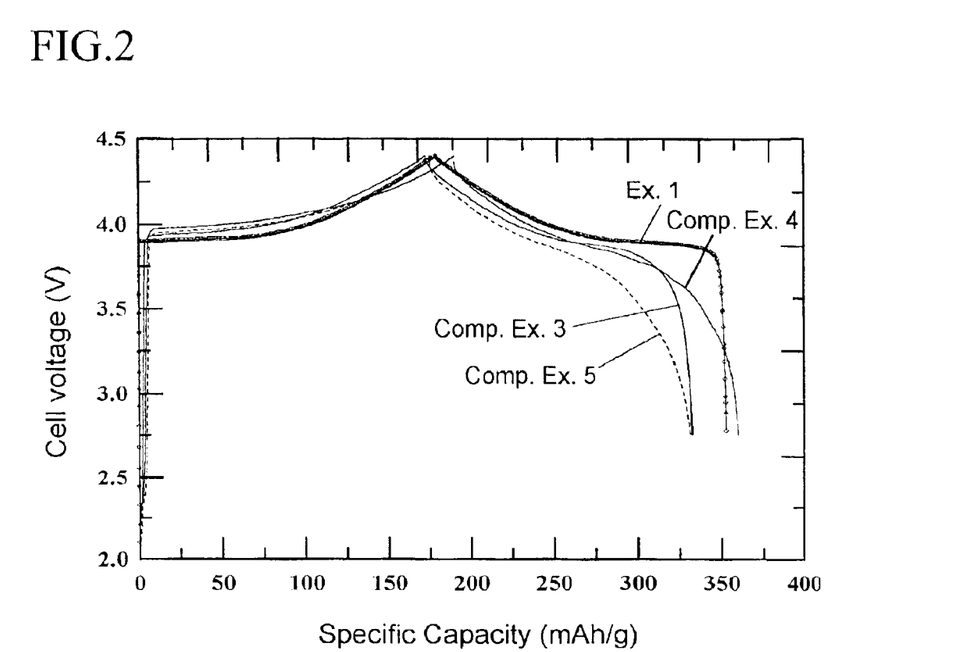
FIG. 2 is a graph showing charge-discharge characteristics at a 0.1 C rate of coin cells according to Example 1 of the present invention and Comparative Examples 3 to 5.

FIG. 2 shows a graph illustrating charge-discharge characteristics at 0.1C at the voltage range of 2.75 to 4.4 V for the test cell of Example 1 of the present invention, and for Comparative Examples 3 to 5. As shown in FIG. 2, the coin cell of Example 1 has improved discharge characteristics over those of Comparative Examples 3 to 5.

Figure 3:
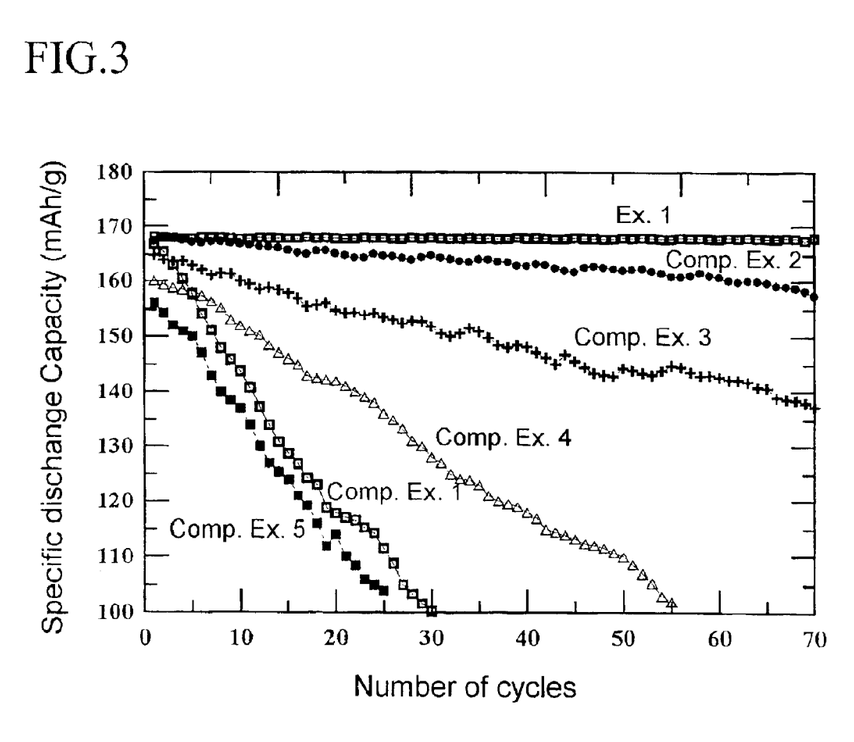
FIG. 3 is a graph showing cycle-life characteristics of coin cells according to Example 1 of the present invention and Comparative Examples 1 to 5.

FIG. 3 shows the cycle-life characteristics of coin cells of Example 1 of the present invention and Comparative Examples 1 to 5. The cycle-life characteristics were measured at 0.5 C at a voltage range of 2.75 to 4.4 V. As shown in FIG. 3, cycle-life characteristics of the coin cell of Example 1 in which the positive active material is coated with the ternary-element oxide compound of $ZrAlO_4$ are distinctly better than those of Comparative Examples 1 to 5 in which the positive active material is coated with the binary-element oxide compound, and they are similar to those of Comparative Example 6.

Figure 4:
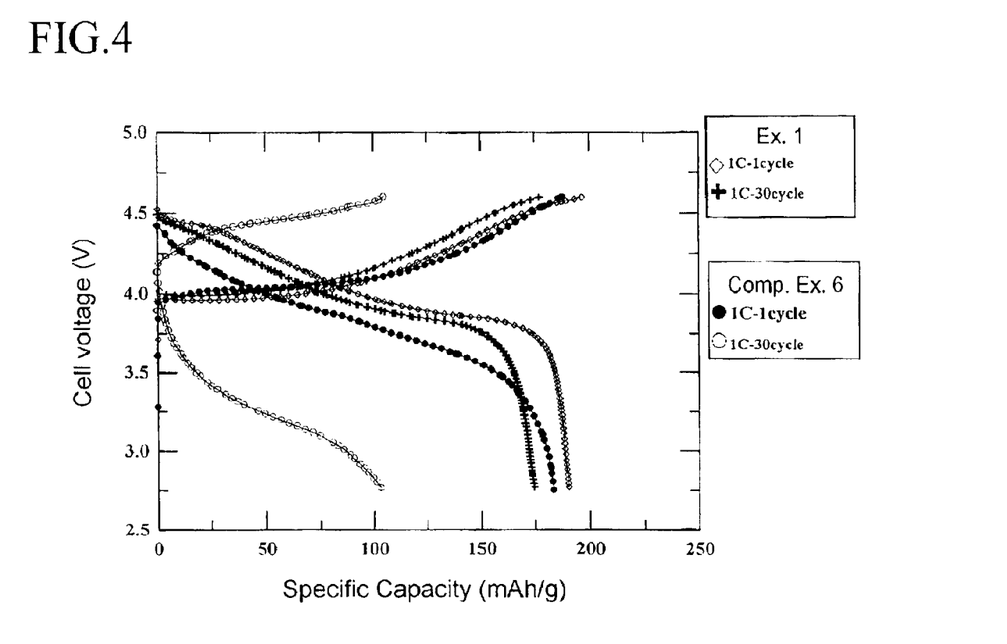
FIG. 4 is a graph showing charge-discharge characteristics at the overvoltage of 4.6V of coin cells according to Example 1 of the present invention and Comparative Example 6.

FIG. 4 shows the charge-discharge characteristics of coin cells of Example 1 of the present invention and those of Comparative Example 6. The charge-discharge characteristics were measured during repeated charge and discharge at 0.1 C at an overvoltage of 4.6 V. As shown in FIG. 4, the coin cell of Example 1 in which the positive active material is coated with the ternary-element oxide compound of $ZrAlO_4$ has improved charge-discharge characteristics over that of Comparative Example 6 in which the positive active material is coated with the binary-element oxide compound. FIG. 4 also shows that the charge-discharge characteristic at the 30th cycle, that is the cycle-life characteristic, of Example 1 is superior to that of Comparative Example 6.

As mentioned above, the positive electrode for the rechargeable lithium battery of the present invention has a coating layer having a very high fracture toughness so that the lithiated intercalation compound has a stable structure due to reduced volumetric expansion during intercalating and deintercalating lithium ions. Accordingly, the cycle-life and charge-discharge characteristics are significantly improved when the rechargeable lithium battery employs the positive active material of the present invention.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A positive active material for a rechargeable lithium battery comprising:
   a lithiated intercalation compound; and
   a coating layer formed on the lithiated intercalation compound, the coating layer comprising an oxide compound having at least two coating elements represented by the following Formula 1:

$$M_pM'_qO_r \quad (1)$$

wherein M and M' are not the same and are each independently at least one element selected from the group consisting of Zr, Al, Na, K, Mg, Ca, Sr, Ni, Co, Ti, Sn, Mn, Cr, Fe, and V;
   $0<p<1$;
   $0<q<1$; and
   $1<r\leq2$, where r is determined based upon p and q.

2. The positive active material according to claim 1, wherein M is Zr.

3. The positive active material according to claim 1, wherein the coating layer has a fracture toughness of at least 10 Mpam$^{1/2}$.

4. The positive active material according to claim 1, wherein the lithiated intercalation compound has a fundamental structure selected from the group consisting of cubic structures, hexagonal structures, and monoclinic structures.

5. The positive active material according to claim 1, wherein the lithiated intercalation compound is selected from the group consisting of the following compounds represented by Formulas (3) to (15):

$$Li_xMn_{1-y}M'_yA_2 \quad (3)$$

$$Li_xMn_{1-y}M'_yO_{2-z}X_z \quad (4)$$

$$Li_xMn_2O_{4-z}X_z \quad (5)$$

$$Li_xMn_{2-y}M'_yA_4 \quad (6)$$

$$Li_xCo_{1-y}M'_yA_2 \quad (7)$$

$$Li_xCo_{1-y}M'_yO_{2-z}X_z \quad (8)$$

$$Li_xNi_{1-y}M'_yA_2 \quad (9)$$

$$Li_xNi_{1-y}M'_yO_{2-z}X_z \quad (10)$$

$$Li_xNi_{1-y}Co_yO_{2-z}X_z \quad (11)$$

$$Li_xNi_{1-y-z}Co_yM'_zA_\alpha \quad (12)$$

$$Li_xNi_{1-y-z}Co_yM'_zO_{2-\alpha}X_\alpha \quad (13)$$

$$Li_xNi_{1-y-z}Mn_yM'_zA\alpha \quad (14)$$

$$Li_xNi_{1-y-z}Mn_yM'_zO_{2-\alpha}X_\alpha \quad (15)$$

wherein
$0.95\leq x1.1$; $0\leq y\leq0.5$; $0\leq z\leq0.5$; $0\leq\alpha\leq2$;
M' is an element selected from the group consisting of Al, Ni, Go, Mn, Cr, Fe, Mg, Sr, V, Sc, Y, and elements of the lanthanoid group;
A is an element selected from the group consisting of O, F, S, and P; and
X is an element selected from the group consisting of F, S, and P.

6. The positive active material according to claim 1, wherein the coating element has a concentration gradient in which the concentration gradually decreases from the surface toward the center of the positive active material.

7. The positive active material according to claim 1, wherein the coating layer has a thickness ranging from 0.01 to 2 μm.

8. The positive active material according to claim 1, wherein the coating element is present in the coating layer in an amount ranging from 0.1 to 10 wt %.

9. A positive active material for a rechargeable lithium battery comprising:
   a lithiated intercalation compound; and
   a coating layer formed on the lithiated intercalation compound, the coating layer comprising a solid-solution compound and an oxide compound having at least two coating elements represented by the following Formula 1:

$$M_pM'_qO_r \quad (1)$$

wherein M and M' are not the same and are each independently at least one element selected from the group consisting of Zr, Al, Na, K, Mg, Ca, Sr, Ni, Co, Ti, Sn, Mn, Cr, Fe, and V;
   $0<p<1$;
   $0<q<1$; and
   $1<r\leq2$, where r is determined based upon p and q,
   wherein the solid-solution compound is prepared by reacting the lithiated intercalation compound with the oxide compound, and the coating layer has a fracture toughness of at least 3.5 MPam$^{1/2}$.

10. The positive active material according to claim 9, wherein M is Zr.

11. The positive active material according to claim 9, wherein the coating layer has a fracture toughness of at least 10 Mpam$^{1/2}$.

12. The positive active material according to claim 9, wherein the lithiated intercalation compound has a fundamental structure selected from the group consisting of cubic structures, hexagonal structures, and monoclinic structures.

13. The positive active material according to claim 9, wherein the lithiated intercalation compound is selected from the group consisting of the following compounds represented by Formulas (3) to (15):

$$Li_xMn_{1-y}M'_yA_2 \quad (3)$$

$$Li_xMn_{1-y}M'_yO_{2-z}X_z \quad (4)$$

$$Li_xMn_2O_{4-z}X_z \quad (5)$$

$$Li_xMn_{2-y}M'_yA_4 \quad (6)$$

$$Li_xCo_{1-y}M'_yA_2 \quad (7)$$

$$Li_xCo_{1-y}M'_yO_{2-z}X_z \quad (8)$$

$$Li_xNi_{1-y}M'_yA_2 \quad (9)$$

$$Li_xNi_{1-y}M'_yO_{2-z}X_z \quad (10)$$

$$Li_xNi_{1-y}Co_yO_{2-z}X_z \quad (11)$$

$$Li_xNi_{1-y-z}Co_yM'_zA_\alpha \quad (12)$$

$$Li_xNi_{1-y-z}Co_yM'_zO_{2-\alpha}X_\alpha \quad (13)$$

$$Li_xNi_{1-y-z}Mn_yM'_zA\alpha \quad (14)$$

$$Li_xNi_{1-y-z}Mn_yM'_zO_{2-\alpha}X_\alpha \quad (15)$$

wherein
$0.95 \leq x \leq 1.1$; $0 \leq y \leq 0.5$; $0 \leq z \leq 0.5$; $0 \leq \alpha \leq 2$;

M' is an element selected from the group consisting of Al, Ni, Co, Mn, Cr, Fe, Mg, Sr, V, Sc, Y, and elements of the lanthanoid group;

A is an element selected from the group consisting of O, F, S, and P; and

X is an element selected from the group consisting of F, S, and P.

14. The positive active material according to claim 9, wherein the coating element has a concentration gradient in which the concentration gradually decreases from the surface toward the center of the positive active material.

15. The positive active material according to claim 9, wherein the coating layer has a thickness ranging from 0.01 to 2 μm.

16. The positive active material according to claim 9, wherein the coating element is present in the coating layer in an amount ranging from 0.1 to 10 wt %.

17. A positive active material for a rechargeable lithium battery comprising:
   a lithiated intercalation compound; and
   a coating layer formed on the lithiated intercalation compound, the coating layer comprising a solid-solution compound and a Zr-containing oxide compound of $Zr_{0.5}Al_{0.5}O_2$,
   wherein the solid-solution compound is prepared by reacting the lithiated intercalation compound with the Zr-containing compound, and the coating layer has a fracture toughness of at least 10 MPam$^{1/2}$.

18. A method of preparing a positive active material for a rechargeable lithium battery comprising:
   preparing a coating liquid comprising an oxide compound of at least two coating elements;
   adding a lithiated intercalation compound to the coating liquid and coating the lithiated intercalation compound with the coating liquid; and
   heat-treating the coated lithiated intercalation compound,
   wherein the surface of lithiated intercalation compound is provided with a coating layer comprising a solid-solution compound and the oxide compound represented by the following Formula 1:

$$M_pM'_qO_r \quad (1)$$

wherein M and M' are not the same and are each independently at least one element selected from the group consisting of Zr, Al, Na, K, Mg, Ca, Sr, Ni, Co, Ti, Sn, Mn, Cr, Fe, and V;

$0 < p < 1$;

$0 < q < 1$; and $1 < r \leq 2$, where r is determined based upon p and q, wherein the solid-solution compound is prepared by reacting the lithiated intercalation compound with the oxide compound, and the coating layer has a fracture toughness of at least 3.5 MPam$^{1/2}$.

19. The method according to claim 18, wherein M is Zr.

20. The method according to claim 18, wherein the oxide compound is $Zr_{0.5}Al_{0.5}O_2$.

21. The method according to claim 18, wherein the lithiated intercalation compound has a fundamental structure selected from the group consisting of cubic structures, hexagonal structures, and monoclimc structures.

22. The method according to claim 18, wherein the lithiated intercalation compound is selected from the group consisting of the following compounds represented by Formulas (3) to (15):

$$Li_xMn_{1-y}M'_yA_2 \quad (3)$$

$$Li_xMn_{1-y}M'_yO_{2-z}X_z \quad (4)$$

$$Li_xMn_2O_{4-z}X_z \quad (5)$$

$$Li_xMn_{2-y}M'_yA_4 \quad (6)$$

$$Li_xCo_{1-y}M'_yA_2 \quad (7)$$

$$Li_xCo_{1-y}M'_yO_{2-z}X_z \quad (8)$$

$$Li_xNi_{1-y}M'_yA_2 \quad (9)$$

$$Li_xNi_{1-y}M'_yO_{2-z}X_z \quad (10)$$

$$Li_xNi_{1-y}Co_yO_{2-z}X_z \quad (11)$$

$$Li_xNi_{1-y-z}Co_yM'_zA_\alpha \quad (12)$$

$$Li_xNi_{1-y-z}Co_yM'_zO_{2-\alpha}X_\alpha \quad (13)$$

$$Li_xNi_{1-y-z}Mn_yM'_zA\alpha \quad (14)$$

$$Li_xNi_{1-y-z}Mn_yM'_zO_{2-\alpha}X_\alpha \quad (15)$$

wherein
$0.95 \leq x \leq 1.1$; $0 \leq y \leq 0.5$; $0 \leq z \leq 0.5$; $0 \leq \alpha \leq 2$;

M' is an element selected from the group consisting of Al, Ni, Co, Mn, Cr, Fe, Mg, Sr, V, Sc, Y, and elements of the lanthanoid group;

A is an element selected from the group consisting of O, F, S, and P; and

X is an element selected from the group consisting of F, S, and P.

23. The method according to claim 18, wherein the coating layer has a thickness ranging from 0.01 to 2 μm.

24. The method according to claim 18, wherein the coating element is present in the coating layer in an amount ranging from 10 to 70 wt %.

25. The method according to claim 18, wherein the coating element has a concentration gradient in which the concentration gradually decreases from the surface toward the center of the positive active material.

26. The method according to claim 18, wherein the heat-treatment step is performed at a temperature ranging from 300 to 800°.

27. The method according to claim 18, wherein the heat-treatment step is performed for a time ranging from 3 to 10 hours.

28. A rechargeable lithium battery comprising a positive active material comprising:

a lithiated intercalation compound; and a coating layer formed on the lithiated intercalation compound, the coating layer comprising a solid-solution compound and an oxide compound having at least two coating elements represented by the following Formula 1:

$$M_p M'_q O_r \qquad (1)$$

wherein M and M' are not the same and are each independently at least one element selected from the group consisting of Zr, Al, Na, K, Mg, Ca, Sr, Ni, Co, Ti, Sn, Mn, Cr, Fe, and V;

$0<p<1$;

$0<q<1$; and $1<r\leq2$, where r is determined based upon p and q, wherein the solid-solution compound is prepared by reacting the lithiated intercalation compound with the oxide compound, and the coating layer has a fracture toughness of at least 3.5 MPam$^{1/2}$.

* * * * *

UNITED STATES PATENT AND TRADEMARK OFFICE
CERTIFICATE OF CORRECTION

PATENT NO. : 6,916,580 B2  
APPLICATION NO. : 10/270811  
DATED : July 12, 2005  
INVENTOR(S) : Jae-Phil Cho It is certified that error appears in the above-identified patent and that said Letters Patent is hereby corrected as shown below:

On the Title Page

| | |
|---|---|
| (73) Assignee | Delete "Samsung SDE", Insert --Samsung SDI-- |
| (57) Abstract, line 14 | Delete "$1<\underline{r}\leqq 2$", Insert --$1<r\leq 2$-- |
| (56) References Cited, OTHER PUBLICATIONS, line 9 | After "English", Insert --Translation of Patent-- |

In the Claims

| | |
|---|---|
| Column 10, line 19, Claim 5 | Delete "$Li_xNi_{1-y-z}Mn_yM'_zA\ \alpha$", Insert --$Li_xNi_{1-y-z}Mn_yM'_zA\ _\alpha$-- |
| Column 10, line 26, Claim 5 | Delete "Go", Insert --Co-- |
| Column 11, line 30, Claim 13 | Delete "$Li_xNi_{1-y-z}Mn_yM'_zA\ \alpha$", Insert --$Li_xNi_{1-y-z}Mn_yM'_zA\ _\alpha$-- |
| Column 12, line 4, Claim 18 | After "the oxide compound", Insert --is-- |
| Column 12, line 26, Claim 21 | Delete "monoclimc", Insert --monoclinic-- |
| Column 12, line 54, Claim 22 | Delete "$Li_xNi_{1-y-z}Mn_yM'_zA\ \alpha$", Insert --$Li_xNi_{1-y-z}Mn_yM'_zA\ _\alpha$-- |

UNITED STATES PATENT AND TRADEMARK OFFICE
CERTIFICATE OF CORRECTION

PATENT NO. : 6,916,580 B2
APPLICATION NO. : 10/270811
DATED : July 12, 2005
INVENTOR(S) : Jae-Phil Cho It is certified that error appears in the above-identified patent and that said Letters Patent is hereby corrected as shown below:

Column 13, line 10, Claim 26    Delete "800°",
                                Insert --800°C--

Signed and Sealed this

Twenty-seventh Day of January, 2009

JOHN DOLL
*Acting Director of the United States Patent and Trademark Office*